(12) United States Patent
Miller et al.

(10) Patent No.: US 7,487,821 B2
(45) Date of Patent: Feb. 10, 2009

(54) FIREPLACE AUGMENTED CHIMNEY HEAT EXCHANGE SYSTEM

(76) Inventors: H. Richard Miller, 3711 55th Ave. SW., Seattle, WA (US) 98116; Robert Miller, 15946 Mariner Dr., Huntington Beach, CA (US) 92649

( * ) Notice: Subject to any disclaimer, the term of this patent is extended or adjusted under 35 U.S.C. 154(b) by 593 days.

(21) Appl. No.: 11/102,435

(22) Filed: Apr. 8, 2005

(65) Prior Publication Data
US 2005/0224073 A1    Oct. 13, 2005

Related U.S. Application Data

(63) Continuation-in-part of application No. 10/348,311, filed on Jan. 21, 2003, now Pat. No. 6,886,626.

(51) Int. Cl.
*F24H 3/00*    (2006.01)

(52) U.S. Cl. .................. 165/47; 165/48.1; 165/124; 165/901; 237/2 B

(58) Field of Classification Search ............... 165/47, 165/48.1, 53, 122, 124, 901; 237/2 B, 50, 237/53, 55; 126/99 R, 58, 400
See application file for complete search history.

(56) References Cited

U.S. PATENT DOCUMENTS

| | | | | |
|---|---|---|---|---|
| 4,144,999 A * | 3/1979 | Zebuhr | ................ | 126/400 |
| 4,179,065 A * | 12/1979 | Zung | ................ | 126/502 |
| 4,204,409 A * | 5/1980 | Satama | ................ | 62/271 |
| 4,344,479 A * | 8/1982 | Bailey | ................ | 165/109.1 |
| 4,420,034 A * | 12/1983 | VanderVaart | ................ | 237/2 B |
| 4,687,133 A * | 8/1987 | Karlstedt | ................ | 237/2 B |
| 4,903,503 A * | 2/1990 | Meckler | ................ | 62/238.3 |
| 5,074,464 A * | 12/1991 | Moore et al. | ................ | 237/19 |
| 5,619,864 A * | 4/1997 | Reedy | ................ | 165/53 |
| 5,924,390 A * | 7/1999 | Bock | ................ | 110/162 |
| 6,047,695 A * | 4/2000 | Eberhardt | ................ | 237/50 |
| 6,347,527 B1 * | 2/2002 | Bailey et al. | ................ | 237/2 B |
| 6,434,969 B1 * | 8/2002 | Sosnowski | ................ | 62/426 |

* cited by examiner

*Primary Examiner*—Ljiljana (Lil) V Ciric
(74) *Attorney, Agent, or Firm*—Michael Bak-Boychuk

(57) ABSTRACT

A heat pump circuit is installed into the inner cavity of a chimney venting the combustion gases of a burner servicing a dwelling with the exterior heat pump coil mounted in an annular gap formed around the upper chimney end. A fan driven by the chimney draft augmented by the burner then rotates an exterior rank of blade segments above the annular space to draw ambient air across the exterior coil. A set of gated apertures in the chimney wall both above and below the flue damper then directs zoned airflows up into the chimney and across the inner coil that is deployed at the lower interior chimney opening with the air heated in a chamber surrounding the burner either selectively routed into the chimney to further increase the chimney draft or routed into the dwelling for warmth.

10 Claims, 3 Drawing Sheets

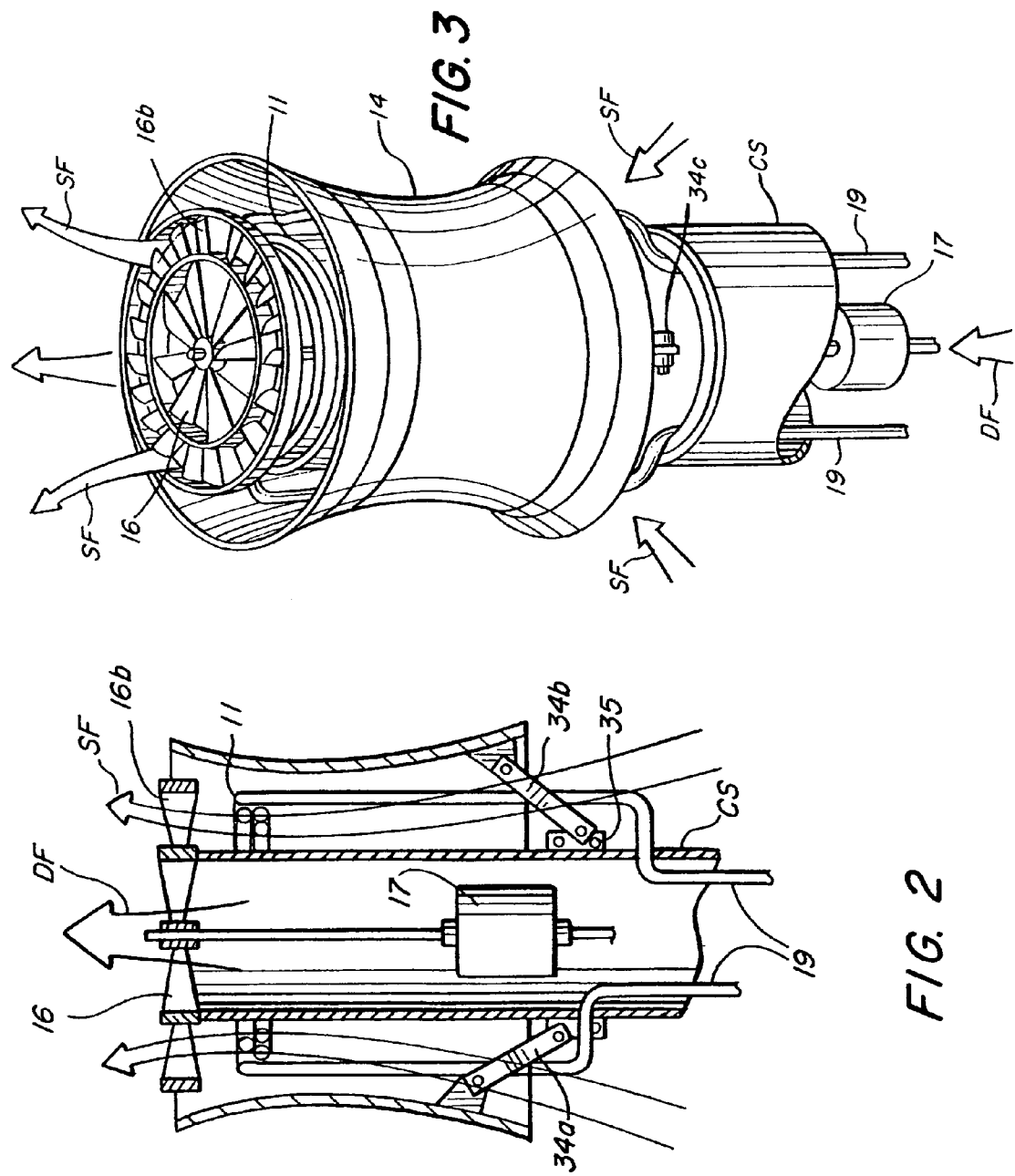

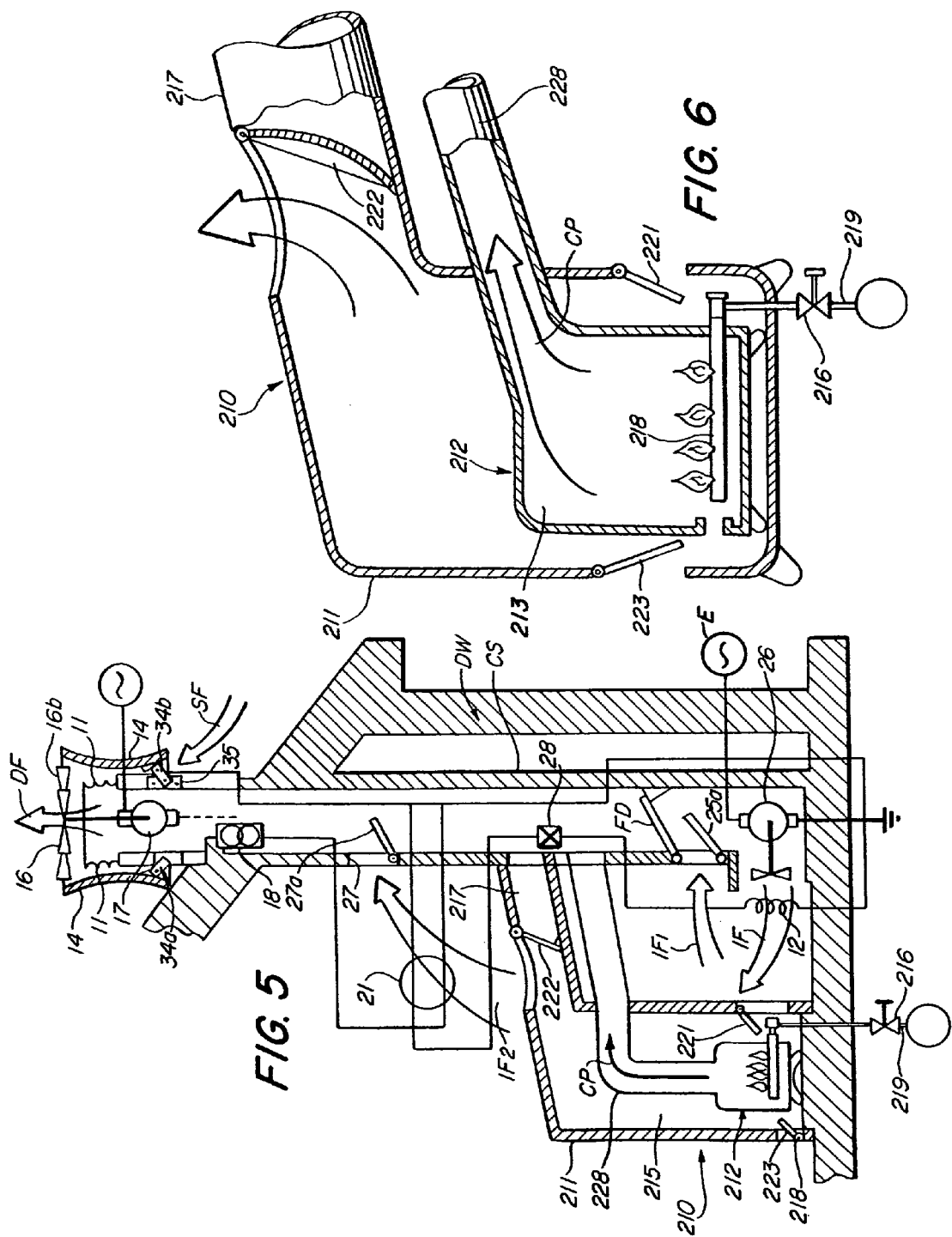

FIREPLACE AUGMENTED CHIMNEY HEAT EXCHANGE SYSTEM

REFERENCE TO RELATED APPLICATIONS

This application is a continuation-in-part of U.S. patent application Ser. No. 10/348,311 filed Jan. 21, 2003, now issued as U.S. Pat. No. 6,886,626 and the benefit of this earlier filing date is claimed for all matter common therewith.

BACKGROUND OF THE INVENTION

1. Field of the Invention

The present invention relates to heat exchange systems, and more particularly to powered heat exchangers, or heat pumps, conformed to extend within a chimney for effecting heat exchange between the interior and exterior ends thereof.

2. Description of the Prior Art

At the core of all human freedom is the convenience that one obtains through the assistance of external energy. Starting with fire, thereafter followed by the water wheel and all the other energy harnessing developments, this drive for freedom has served as the consistent forcing mechanism for most of our technological advancements. Recently, however, the phase lag between the efficiencies of energy use and the growth trends in the Earth's population have resulted in an exponentially increasing demand on all sources of energy and, of course, this increasing demand was then closely followed by exponential increases in energy price. This exponential energy cost burden, directly associated with population density increases, is now the principal constraint on the choices available to the energy user and has become the primary constraint on all human choices.

One reason for this narrowing of constraints is the inherent mismatch between the energy use efficiency of the devices currently assisting human activity and the exponential increase in energy price. For example, we have all grown accustomed in our past to the need of a fireplace, or a stove, and the ubiquitous chimney structure associated therewith that is now found in most residential buildings. At one time this inefficient mechanism for home heating was the prevailing standard which now provides a massive phase lag or inertia for any new development. Simply, the cost decisions involved in the design of a dwelling at an earlier time are wholly inapposite in the new constraints just a few years later. Nonetheless such phase lags persist and one aspect of all enlightened energy use development entails the convenience with which this existing architecture is adapted to the later developed use.

In the past various systems have been devised which in one way or another attempt to marry a heating or cooling device with a fireplace. Examples of such combinations can be found in the teachings of U.S. Pat. No. 4,132,263 issued to Stinnett; U.S. Pat. No. 4,126,118 to Haynes; U.S. Pat. No. 5,983,890 to Thomas, et al.; U.S. Pat. No. 5,775,408 to Shimek, et al.; U.S. Pat. No. 4,916,918 to Marelli; and others. While suitable for the purposes intended each of the foregoing focuses on the fireplace structure as the accommodation mechanism and does not utilize to full advantage the vertical gas column of the chimney associated therewith.

Those in the art will appreciate that the fundamentals of all thermodynamic exchange entail the fourth power of the temperature difference for radiative heat transfer and a third power effect for all convective transfer. Heat loss or gain is therefore exponentially related to temperature difference and the temperature difference between the gas column within a chimney and its ambient environment is the primary parameter for producing convective chimney drafts. Of course, this draft exists only with positive temperature differences as the fireplace-chimney mechanism is a development pre-dating the evolution of the compression-expansion cycle associated with reversible heat pumps. Efficient utilization of this earlier ubiquitous one-directional chimney, augmented by a fireplace, combined with the high efficiency heat pumps that are now available is a matter of substantial focus and concern and it is one such combination that is disclosed herein.

SUMMARY OF THE INVENTION

Accordingly, it is the general purpose and object of the present invention to mount a reversible heat pump circuit within the interior of a heater augmented chimney terminating in one external heat exchanger at the chimney top and an interior exchanger at the chimney intake.

Other objects of the invention are to provide a chimney deployed heat pump circuit conformed to utilize the chimney draft to effect heat exchange.

Additional objects of the invention are to provide a chimney deployed heat exchange system in which the chimney draft is utilized to augment the heat exchange.

Yet further objects of the invention are to produce an efficient heat pump cycle with the augmenting aid of the drafts created in a chimney.

Briefly, these and other objects are accomplished within the present invention by deploying a heat pump within a chimney structure, with the exterior heat exchanger mounted in an annulus surrounding the upper chimney end and the interior exchanger at the chimney fireplace inlet. A reversibly connected compression pump that forms the heat pump circuit is then deployed along those circuit branches that extend through the chimney interior, said pump being driven by the combined outputs of an interior turbine ring mounted within the chimney to be driven by the chimney draft and an electric motor. The same fan structure is then provided with an exterior blade ring that draws ambient air through the annular exterior coil, thus effecting the heat exchange.

Those in the art will appreciate that in substantially all conditions the temperature of the air inside a dwelling increases with height. Nonetheless, most of the human activities in the same dwelling occur within the lower layers. To obtain useful benefit from any heating or cooling system some temperature stratification is inherent and is utilized herein in the manner of secondary recovery to create the chimney draft both during heating and during cooling. The warmer upper strata of the air volume within the dwelling served by the inventive system is therefore controllably drawn into the upper portion of the chimney through a controlled opening, providing both the necessary air circulation and the augmenting drive for any compression or air movement. In this manner those portions of a cycle that usually constitute a loss are used to advantage herein.

One will note that the heating or cooling capacity of the foregoing inventive implementation depends on the vertical temperature gradient that is greatly affected by the vertical thermal conductivity of the structure, the relative mass density thereof and the convection exchange of the interior column. Even in the favorable settings of low energy costs this vertical stratification has led to a volumetric fractioning practice where the internal living volume was typically divided into various rooms and a heat distribution system was then used to control the local temperatures. This fractioned distribution lends itself for effective augmentation by a separate heat source, such as a fireplace, stove or other heating structure, assisting in the development of a heated column within the chimney stack. Simply the thermal separation of the several heat zones from the heat gradient in the chimney stack allows for convenient augmentation even during the cooling cycle by a separate heating source, with the heat output thereof utilized increase the chimney column differential regardless of the desired direction of the heat exchange.

BRIEF DESCRIPTION OF THE DRAWINGS

FIG. 2 is a diagrammatic detail of one portion of the system shown in FIG. 1;

FIG. 3 is a detail view, in perspective, of that portion of the inventive system shown in FIG. 2;

FIG. 5 is a further diagrammatic illustration of the inventive chimney implemented heat exchange system, like that generally shown in FIG. 1, with the chimney draft differential augmented by a separate heating source; and FIG. 6 is yet another diagrammatic detail illustrating the operative arrangement of the augmenting heating source shown generally in FIG. 5.

DESCRIPTION OF THE PREFERRED EMBODIMENT

Figure 1:
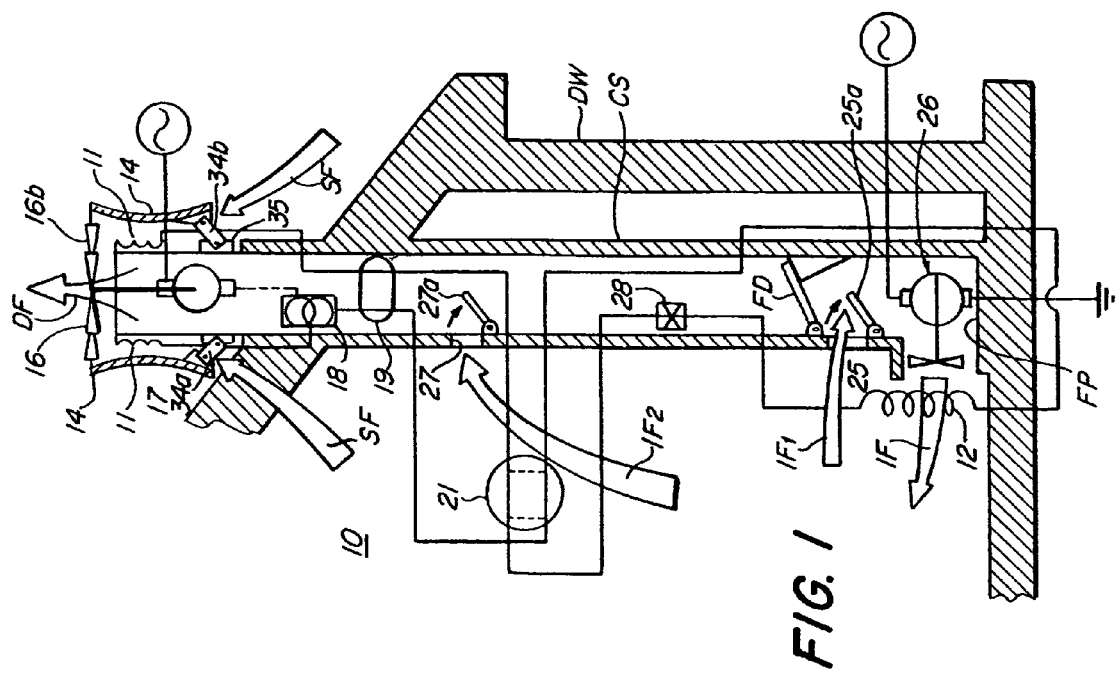
FIG. 1 is a diagrammatic illustration of the inventive chimney implemented heat exchange system disclosed herein.
Figure 4:
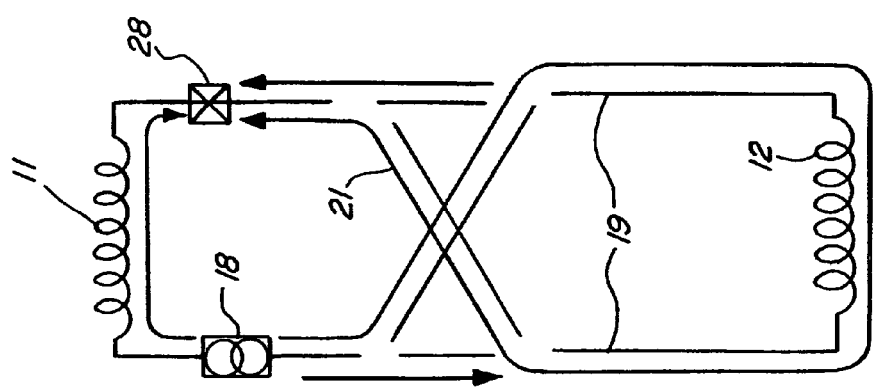
FIG. 4 is a cycle diagram illustrating the thermodynamic cycles effected by the inventive system disclosed herein.

As shown in FIGS. 1-4, the inventive heat pump system generally designated by the numeral 10, comprises an outdoor coil 11 and an indoor coil 12 deployed respectively at the upper end of a conventional chimney stack CS and in the front opening of a fireplace (or wood burning stove) FP. Preferably, the outdoor coil 11 is formed as an annular winding that is then deployed in an annular space formed by a spaced tubular shroud 14 fixed about the exterior of the upper end of the chimney stack CS, with the chimney gas column then venting into the annular interior of this coil loop. This venting draft flow, shown as flow DF, may then be utilized to induce a secondary flow of exterior air SF through the annular space defined between the chimney and shroud 14, drawing the exterior air through coil 11 which is then further enhanced by an annular fan arrangement including an interior fan 16 driven by an electrical motor 17 that is also geared to drive a compressor 18. A reversing valve 21 conformed to interconnect the heat pump tubing circuit 19 then determines the direction of heat transfer between cooling and heating. In this manner the existing chimney draft is rendered useful to augment the electrical motor 17 which also provides the primary motive power for the compression part of the heat cycle.

It will be appreciated that the past construction practices of a dwelling resulted in a preference for a tall chimney structure as the primary mechanism insuring efficient burning of fuel which was then modulated to meet the ambient conditions by the ever present flue damper FD. The invention puts to use the ubiquitous tall chimney and the drafts it produces to assist in the power requirements of the compression cycle inherent in all heat pumps, reducing the power demands of the primary energy consumer in a heat pump cycle. Of course, the interior air flow IF across coil 12 that forms the interior part of the heat pump cycle runs counter to this direction. For that reason the present invention contemplates a further modification in the form of a grated opening 25 across the chimney wall communicating into the chimney interior right below flue damper FD allowing for an air circulation loop IF1 induced by a second electrically driven fan 26 back into the fireplace FP. A second opening 27 further up the chimney wall then allows the warmer strata air flows IF2 of the air circulation drafts in the dwelling DW back into the chimney to reconstitute the chimney air flow with the expansion device 28 that completes the heat transfer circuit then positioned along the tubing conduit 19 between the two openings 25 and 27. Each of the openings 25 and 27 may further include a corresponding manually adjustable gate panel 25a and 27a allowing the user to select the circulation levels of air currents IF1 and IF2 most appropriate for the dwelling particulars.

The drafts that are inherent in the chimney gas column and act on the interior fan 16 to augment the compression torque may be further utilized to enhance the heat exchange flow through the coil 11 within shroud 14 by way of an exterior row of fan blade extensions 16b in this annular gap. This exterior blade ring 16b then augments the secondary air flows SF and by controlling the elevation of shroud 14 and the insulation around the chimney end more or less of the chimney heat may be recovered. For this reason an adjustable set of mounting brackets 34a, 34b and 34c is provided, distributed about the chimney and including plural fastener openings 35 to accommodate the desired selection. In this manner a conventional heat pump cycle is adapted for mounting within variously configured chimney structures with a wide range of adjustment in which the variable chimney column height bounded by shroud 14 is used as a final or trimming adjustment by the homeowner. Thus all the benefits of adjustment dictated by experience are preserved which optimize the benefit of the existing chimney height in accordance with the instant system parameters.

It will be appreciated that the capital cost of a residential structure represents a major component of the earnings of a typical family. Conservation of such capital investment has led to various adaptations of the original dwelling and the typical home invariably includes a unique set of improvement choices and modifications accumulated with time. For this reason the air circulation patterns are also unique, having the only common features of an upward current for warm air dictated by thermodynamic exchange. A rigorous retrofit configuration is therefore inapposite and the above described set of gated chimney wall apertures or openings 25 and 27 are therefore exemplary only, it being intended to provide two openings in the several chambers comprising the dwelling DW. In each instance, however, the required fresh air input invariably produces a warm air column in the chimney resulting in the draft DF that both warms that portion of the tubing circuit 19 that is exposed thereto and also assists in the air exchange across coils 11. Of course, this exchange is determined by the length of the tubing run, i.e., by the selection of the expansion valve point between openings 25 and 27. This selection is best determined by the average local temperatures with the expansion valve moved down the chimney in colder climatic zones. In this manner a conveniently adaptable heat transfer system is devised which fully accommodates all the various choices that have been imbedded in the dwelling structure.

By reference to FIGS. 5 and 6 the inventive chimney implemented heat pump cycle may be combined with a heating assembly generally designated by the numeral 210 defined by an exterior chamber 211 enclosing an burner housing 212 to form a plenum chamber 215 therebetween, with the combustion process contained within a burner cavity 213 then emitting its combustion products CP directly into the chimney stack CS. Like numbered parts functioning in like manner, heating assembly 210 may be positioned adjacent the opening in fireplace FP in an alignment wherein the heat exchange flow IF driven across coil 12 by the fan assembly 26 is either conveyed through a selectively articulated gate 221 into the plenum chamber 215 or is turned to bypass the plenum to merge with the air flow circulation IF2. In this latter mode all the heated air in the plenum chamber 215 is channeled into a return duct 217 to be directly conveyed into the chimney stack CS by shutting an exit gate 222 in the plenum enclosure. Thus during the cooling cycle both the combustion products CP and the air heated in the plenum around the burner housing 212 are conveyed directly into the chimney, increasing the draft therein. During the heating part of the cycle the exit gate 222 is opened, thus letting heated air into the living area to join the established air flow loops IF 1 and/or IF2 depending on the heating demand.

Of course, while the articulation of gates 221 and 222 may be ganged with the selection of the chimney heat pump cycle these events may also be left uncoupled, thus increasing the increments, and therefore the degree of control available to the user. For example, on those very hot days when the cooling demands are the greatest the exchange rate developed by the coil 12 can be partially controlled by modulating the heat level in the chimney stack, or more precisely the heat output of the heater assembly 210. This modulation can be effected by controlling the setting of a gas valve 216 in a gas line 219 feeding a burner 218 within the burner housing 215 with the concurrent admission of air controlled by a pivoted fresh air inlet 223 in the lower surface of the housing. The products of this combustion are then conveyed by a flue pipe 228 into the chimney stack CS at a point above the flue damper FD, thereby increasing the draft flow DF across the interior blade rank 16, increasing the cooling across coil 12. By the same token, this increased flue draft capacity also augments the heat pump cycle when interior heating is desired across coil 12, thus supplementing the heat generated in the burner.

It will be appreciated that the foregoing arrangement combines the functions of a heat pump with a combustion facility, thus allowing for smaller capacity from each part of this combination. Moreover, the conventional form of the heater assembly renders useful existing heater structures, obtaining further savings in the cost thereof.

Obviously, many modifications and variations can be effected without departing from the spirit of the invention instantly disclosed. It is therefore intended that the scope of the invention be determined solely by the claims appended hereto.

It is claimed:

1. A heat pump system conformed for deployment between the interior lower end and exterior upper end of a chimney provided in a dwelling, said chimney including an articulated flue damper proximate the interior lower end thereof conformed for manual articulation to close off the passage of air therethrough, comprising in combination;

a heating source connected to said chimney for developing an upward draft flow therein between said lower and upper ends thereof, said heating source including an air chamber thereabout conformed for heating air therein and for selectively admitting said heated air into said chimney or said dwelling;

a first heat exchange coil deployed around the exterior surface of said chimney proximate said upper end;

a second heat exchange coil deployed proximate said lower end of said chimney;

conveying means deployed within the interior of said chimney and connected between the ends of said first and second coils for conveying heat exchange fluid therebetween, said conveying means further including reversing means for selective reversal of the connection paths between the ends of said first and second coils and an evaporator restriction for reducing the pressure of the fluid in said conveying means;

a second aperture formed in said chimney communicating between the interior of said dwelling and that portion of the chimney interior that is confined below and between said flue damper and said second heat exchange coil;

first power means deployed in said chimney above said damper for providing motive power to produce air flow across said first heat exchange coil including power augmentation means rendered operative by the chimney draft formed between said first aperture and said upper end of said chimney;

second power means deployed in said chimney subjacent said damper for providing motive power to produce air flow through said second aperture and across said second heat exchange coil; and gate means connected to said air chamber for selecting the portions of said heated air that are respectively divided between said chimney and said dwelling.

2. Apparatus according to claim 1, wherein:
   said power augmentation means includes a fan mounted within said chimney for rotary advancement by the chimney draft, said fan including an exterior rank of fan blade segments extending into said annular space for urging exterior air therethrough.

3. Apparatus according to claim 2, wherein:
   said fan is further connected to a source of motive power.

4. Apparatus according to claim 3, wherein:
   said first and second aperture each include a corresponding cover mounted for adjustable opening deployment.

5. Apparatus according to claim 4, further comprising:
   compression means connected to said conveying means and to said first power means for compressing said heat exchange fluid in the interior thereof.

6. In a dwelling structure provided with a chimney characterized by an interior lower end and exterior upper end, a burner provided with a flue conduit connected to said chimney for conveying products of combustion thereto, said chimney further including an articulated flue damper proximate the interior lower end thereof conformed for manual articulation to close off the passage of air therethrough, the improvement comprising:

a first heat exchange coil deployed around the exterior surface of said chimney proximate said upper end;

a second heat exchange coil deployed proximate said lower end of said chimney;

conveying means deployed within the interior of said chimney and connected between the ends of said first and second coils for conveying heat exchanged fluid therebetween, said conveying means further including reversing means for selective reversal of the connection paths between the ends of said first and second coils and an evaporator restriction for reducing the pressure of the fluid in said conveying means;

a first aperture formed in said chimney communicating between the interior of said dwelling and that portion of the chimney interior that is confined above and between said flue damper and said first heat exchange coil;

a second aperture formed in said chimney communicating between the interior of said dwelling and that portion of the chimney interior that is confined below and between said flue damper and said second heat exchange coil;

first power means deployed in said chimney above said damper for providing motive power to produce air flow across said first heat exchange coil including power augmentation means rendered operative by the chimney draft formed between said first aperture and said upper end of said chimney;

second power means deployed in said chimney subjacent said damper for providing motive power to produce air flow through said second aperture and across said second heat exchange coil;

compression means connected to said conveying means and to said first power means for compressing said heat exchange fluid in the interior of said conveying means and said first and second coil to render operative the combination thereof as a heat pump;

an air chamber thereabout conformed for heating air therein and for selectively admitting said heated air into said chimney or said dwelling; and gate means connected to said air chamber for selecting the portions of said heated air that are respectively divided between said chimney and dwelling.

7. Apparatus according to claim 6, further comprising:
a tubular segment mounted in a surrounding alignment about said exterior upper end of said chimney to define an annular space thereabout for receiving said exterior heat exchange coil therein.

8. Apparatus according to claim 7, wherein:
said power augmentation means includes a fan mounted within said chimney for rotary advancement by the chimney draft, said fan including an exterior rank of fan blade segments extending into said annular space for urging exterior air therethrough.

9. Apparatus according to claim 8, wherein:
said fan is further connected to a source of motive power.

10. Apparatus according to claim 9, wherein:
said first and second aperture each include a corresponding cover mounted for adjustable opening deployment.

* * * * *